United States Patent [19]

Pinson

[11] 4,172,277
[45] Oct. 23, 1979

[54] CHOPPING CONTROL SYSTEM FOR A CONVERTER IN A DC ELECTRICAL POWER SUPPLY

[75] Inventor: Denis Pinson, Les Clayes sous Bois, France

[73] Assignee: Compagnie Internationale pour l'Informatique Cii-Honeywell Bull (Societe Anonyme), Paris, France

[21] Appl. No.: 875,538

[22] Filed: Feb. 6, 1978

[30] Foreign Application Priority Data

Feb. 14, 1977 [FR] France .................. 77 04124

[51] Int. Cl.² ............... H02M 7/00; H02P 13/00
[52] U.S. Cl. ................................. 363/124; 363/80; 363/21
[58] Field of Search .......... 363/19, 21, 26, 74, 363/78, 80, 89, 123, 124; 307/240, 253, 300

[56] References Cited

U.S. PATENT DOCUMENTS

| | | | |
|---|---|---|---|
| 4,034,282 | 7/1977 | Renard | 363/124 X |
| 4,087,850 | 5/1978 | Koizumi | 363/80 X |

*Primary Examiner*—William M. Shoop
*Assistant Examiner*—Peter S. Wong
*Attorney, Agent, or Firm*—Cameron, Kerkam, Sutton, Stowell & Stowell

[57] ABSTRACT

A system for controlling chopping for a converter in a DC electrical power supply.

A transistor is arranged for chopping the DC input voltage which is connected to a chopping transformer. A control transistor controls the chopping transistor by means of pulses which it receives from a clock, via a pulse transformer.

10 Claims, 3 Drawing Figures

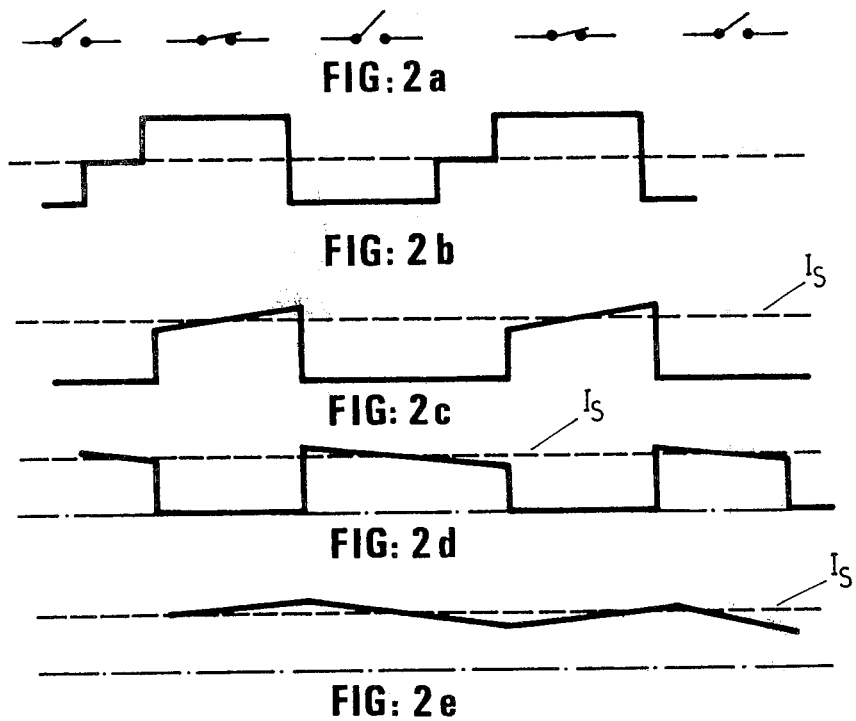
FIG: 2
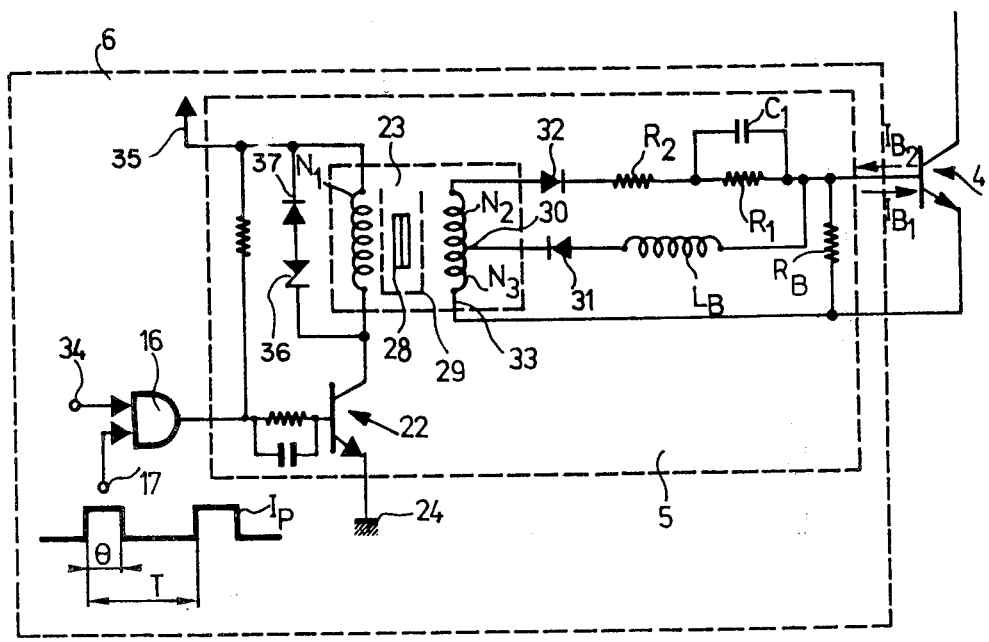
FIG: 3

CHOPPING CONTROL SYSTEM FOR A CONVERTER IN A DC ELECTRICAL POWER SUPPLY

BACKGROUND OF THE INVENTION

1. Field of the Invention

The present invention relates to a system for controlling chopping for a converter in a DC electrical power supply.

2. Description of the Prior Art

A DC power supply enables a DC voltage to be obtained either from an alternating electrical supply source or from a DC electrical supply. The circuit which enables this transformation to take place is termed a converter. The converter needs to be designed in such a way that the power supply causes the output voltages to be galvanically isolated from the main supply, and supplies one or more DC voltages which exhibit very low residual ripple. These voltages need to be highly stable no matter what changes may take place in current drain, the source supply voltage or ambient temperature.

The construction of a power supply depends upon the size of the machine to which power is supplied. In the field of high-capacity power supplies, the current trend is towards the decentralization of functions. This has resulted in the appearance of genuine power-supply "systems" in which various kinds of converter sub-assemblies can be distinguished. For example, there are (1) AC to DC converters which produce a DC voltage from an alternating supply source.

(2) AC to AC converters which produce AC voltage of higher frequency than the frequency of an alternating supply source.

(3) DC to AC converters which produce an AC voltage from a DC supply source and which are generally referred to as inverters.

(4) DC to DC converters which produce a DC voltage from a DC supply source. These are chopping converters. In this kind of converter the DC supply output voltage is chopped by a signal of more or less high frequency.

Converters of the DC to DC kind may be further divided into two categories. The first type are known as asymmetrical converters in which the magnetic core of the isolating transformer (if there is one) is excited in only one direction. The second type are known as symmetrical converters in which the magnetic core of the isolating transformer is excited alternately in one direction and then in the other. A drawback of these converters is that they require conduction-restricting limiters to avoid damage to the chopping transistors connected to the chopping transformer.

A principal object of the present invention is to provide an improved chopping control system for controlling the chopping transistor of a power supply which makes use of a symmetrical converter. The improved system of the invention makes it possible to reduce the switching time of the chopping transistor while preventing its rapid destruction. It also enables the residual ripple level of the power supply to be reduced, while at the same time providing good galvanic isolation between the input and output of the power supply.

SUMMARY OF THE INVENTION

In accordance with the invention, the chopping control system comprises:

(1) A chopping transistor whose collector is connected, via the primary winding of a chopping transformer, to a first terminal of a source of DC voltage which is to be chopped, the emitter of this transistor being connected to a second terminal of this source of voltage to be chopped. The secondary winding of the chopping transformer is connected to a rectifying circuit. The chopping transformer provides galvanic isolation between the input and output of the power supply;

(2) A transistor for controlling the chopping transistor whose emitter is connected to a fixed reference potential and whose collector is connected to a DC supply source. The base of this transistor receives clock pulses to control the chopping; and (3) A pulse transformer whose primary winding is connected between the collector of the control transistor and the DC supply source. The secondary winding of this transformer is connected by one of its ends to the base of the chopping transistor and by its other end to the emitter of the chopping transistor. This transformer is responsible in particular for providing good galvanic isolation between the circuit connected to the control transistor and the circuit connected to the chopping transistor.

In an advantageous embodiment of the invention, the secondary winding of the pulse transformer is connected, by one of its ends, to the base of the chopping transistor, via a first rectifier which conducts in the direction of the base current flow. This secondary winding has an intermediate tap, which is connected to the base of the chopping transistor, via a second rectifier which conducts in a direction opposite from that of the base current flow of the chopping transistor. This intermediate tap connection ensures that more efficient use is made of the magnetizing energy of the pulse transformer.

The system of the present invention enables the charges stored in the emitter-base junction of the chopping transistor to be controlled. It also allows galvanic isolation between the rectified voltage of the AC mains and the output of the converter, and galvanic isolation between the control system and the output of the converter. Finally, it allows the chopping transistor to be re-blocked gradually with an abrupt changeover to the conductive state.

BRIEF DESCRIPTION OF THE DRAWINGS

Other features and advantages of the invention will become apparent from the following description, which refers to the accompanying drawings, in which:

FIG. 2 shows diagrams of the currents and voltages which appear at various points in the converter of FIG. 1.

FIG. 3 shows the system for controlling the chopping transistor.

DESCRIPTION OF THE PREFERRED EMBODIMENTS

Figure 1:
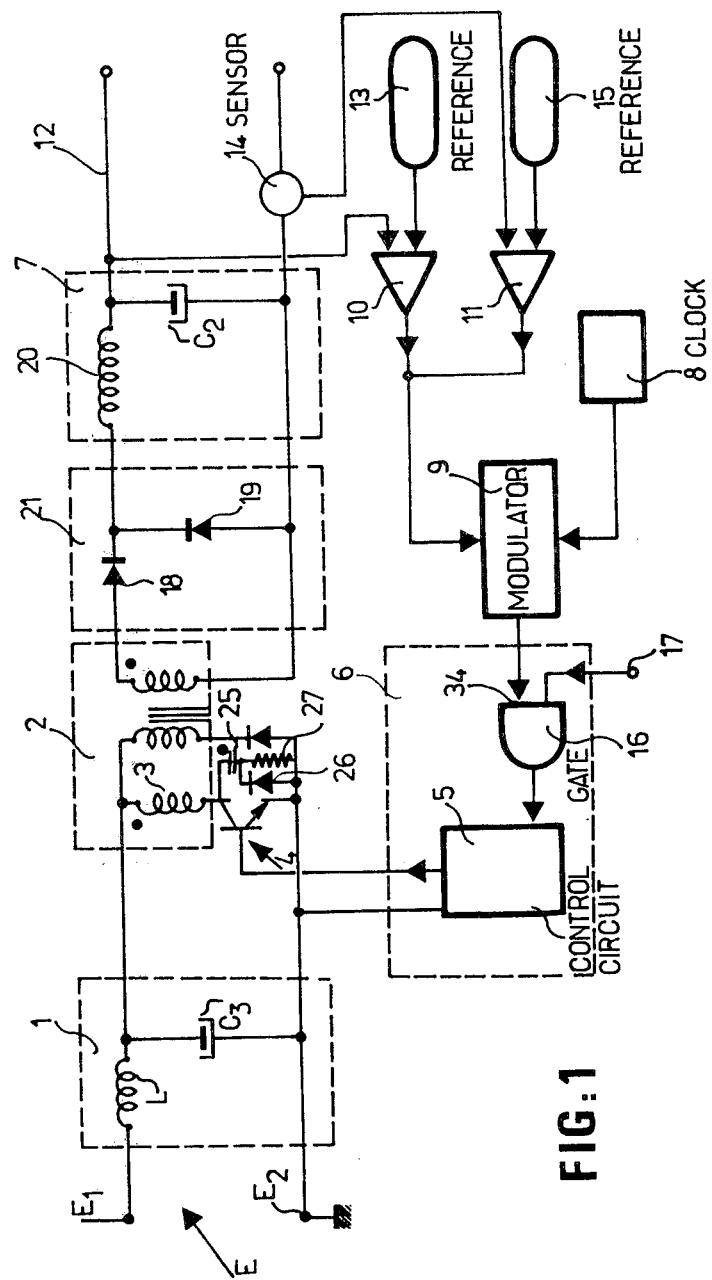
FIG. 1 is a schematic view of a DC to DC converter module in which use is made of a system according to the invention for controlling the chopping transistor.

Referring to FIG. 1, there is shown a converter module of the DC to DC type whose input E is connected to a basic converter module of the AC to DC type.

Together, these two modules form a DC power supply. The converter module of the DC to DC type receives at its input E, across the first and second terminals E1 and E2, a rectified voltage developed from an AC mains source (not shown). The rectified voltage is applied to an input filter 1, which may be formed, for example, by an inductance L and a capacitor C3. In comparison with a resistance/capacitance filter, a filter of this kind has the advantage of low dissipation and a good power factor.

The voltage, having been rectified and then filtered in this way, is applied to the primary of an isolating chopping transformer 2, one of whose primary windings is connected at one end to the collector of a chopping transistor 4 and at its other end to the first terminal E1 of the source of voltage to be chopped through series inductance L. Chopping transistor 4, by means of the control system 6 of the invention, allows the rectified voltage to be chopped by means of square-wave pulses.

The chopping transistor 4 and the chopping transformer 2 both operate at a relatively high frequency such as, for example, 20 kilohertz. Thus, the size of the windings of the transformer and filter, which components alone represent 60 to 80% of the total volume of the converter, is considerably reduced as compared with converters which operate at low frequencies. In addition, the energy efficiency is far higher. The converter module also includes an output rectifier circuit 21 formed by two diodes 18, 19.

Output rectifier circuit 21 is connected to an output filter 7 which comprises, in a conventional fashion, an inductance 20 and a capacitor C2. The filter acts on the rectified voltage at a frequency of approximately 20 kilohertz. The voltage obtained at the output is the mean DC component of the rectified voltage. Capacitor C2 is chosen to have an adequate capacity and low impedance value such that the filter causes sufficient attenuation for the residual ripple to be slight. The value of the inductance 20 is governed by the minimum output demand and by the response of the converter under transitional load conditions.

The signals which appear at the output terminals of the rectifier circuit and the output filter will be described in detail below with reference to FIG. 2.

The converter module also includes a clock 8 which generates pulses which fix the chopping frequency at a value close to 20 kilohertz in the case of the embodiment being described. The length of the pulses restricts the conduction time of the chopping transitor 4 to 40% of the period of the pulses. This is done to protect the chopping transistor against non-recovery of the magnetizing energy of the transformer. The output of the clock is connected to the input of a modulator 9. At its other input this modulator receives signals from a voltage-error amplifier 10 and a current-error amplifier 11.

The voltage-error amplifier 10 is an operational amplifier connected to compare the level of the output voltage 12 from the converter with a reference voltage 13. This reference voltage may be supplied, for example, by a Zener diode of very high stability. Once amplified, the error voltage is applied to the modulator, which acts on the control circuit in such a way as to modify the length of the chopping pulses and thus correct the output voltage.

The current-error amplifier 11 is an operational amplifier connected to restrict the output current from the module so as on the one hand to protect the module and on the other hand to enable a plurality of DC to DC converter modules to be connected in parallel to the output of a basic converter module of the AC to DC type. The amplifier 11 is connected to a current sensor 14 which provides a voltage proportional to the output current from the converter. It is also connected to a reference potential 15. The amplifier thus compares the voltage provided by the sensor with the reference potential 15 in order to provide the modulator 9 with an error voltage. The modulator then acts on the control system in such a way as to reduce the time for which the chopping transistor conducts when output current becomes higher than a predetermined value.

Referring now to FIG. 2, there are shown the voltages and currents at various points in the circuit of FIG. 1 when the chopping transistor 4 is in the states indicated schematically in FIG. 2a. When the transistor 4 is conducting it is shown as a closed switch; when it is not conducting it is shown as an open switch. The various states of the transistor 4 depend, of course, on the pulses which it receives at its base from the control circuit 5, which latter is in turn controlled by the clock 8, via the modulator 9 and the voltage and current amplifiers 10 and 11.

The diagram in FIG. 2b represents the voltage in the secondary of the transformer 2. When the transistor is not conducting, the voltage is zero, while when the transistor is conducting the voltage reaches a certain level which is positive or negative depending upon the polarity of the pulses supplied by the control circuit 6.

The diagram of FIG. 2c represents the current in the diode 18 of the output rectifying circuit 21, while the diagram in FIG. 2d represents the current in the diode 19 in this rectifying circuit. Also shown in these two diagrams, in broken lines, is the mean value of the output current. Finally, the diagram in FIG. 2e represents the current in the inductance 20 of the output filter 7 with the mean value Is of the output current from the converter shown as a broken line. This mean current in diode 18 is greater than in diode 19. In order to minimize losses resulting from the forward voltage drop and at switching, the diodes used are of the Schottky type. They show a forward drop of 0.5 volts at a current of 50 amperes, which is a distinct advantage over silicon diodes in which the forward voltage drop is 1.2 volts. Schottky diodes also have the advantages of being fast, and of having short reverse recovery times and low reverse current, thus giving minimal dissipation.

The chopping transistor operates under special conditions. In effect, when it is reblocked the voltage to which it is subjected may exceed the collector/emitter voltage VCEO provided that the current is practically zero. To achieve this, there is provided a protective circuit formed by a capacitor 25, a diode 26 and a resistor 27 (FIG. 1). This circuit diverts the current while the voltage is rising and the transistor switches onto a purely inductive circuit. Semiconductor manufacturers recommend that transistors be re-blocked by cancelling out and then reversing the base current $I_B$ in order to reduce the time taken for this current to fall. The change in current with respect to time $$\frac{dI_B}{dt},$$

is thus controlled. If the transistor is re-blocked by a generator of low internal resistance the base current $I_B$ which results is very high and is close to the current in the collector. The storage time is short, but the emitter current, which is the difference between the base and collector currents, falls to zero and this causes the emitter-base junction to block. The emitter thus ceases to have any effect on the behavior of the transistor. The base-collector junction behaves as a slow-speed diode during the whole of the turn-off time of the transistor. The power dissipated is considerable. To prevent this, both junctions are re-blocked simultaneously by controlling $$\frac{dI_B}{dt}.$$

The eliminated and the current changeover time is short.

Referring to FIG. 3, there is shown the control system 6 of FIG. 1 which consists on the one hand of a control circuit 5 and on the other of a logic circuit 16. This logic circuit enables width-modulated chopping control pulse Ip whose duration $\theta$ and period T are set by clock 8 to be applied to the control circuit, the pulses being received at 34. The logic circuit, which is of the "AND" kind, also enables the control of chopping by the transistor 22 to be blocked either by an external signal or by a signal from an over-voltage detector situated in the basic module, which arrives at an input 17. In the Figure the forward current in the base of the transistor 4 is marked $I_{B1}$, and the reverse current $I_{B2}$.

The control circuit contains a control transistor 22 having its base connected to the output of the logic AND circuit 16 and its collector connected to a pulse transformer 23. The emitter of the control transistor is connected to a fixed reference potential 24 and the control circuit as a whole is supplied at 35 from a DC voltage source which is not shown. Unreferenced resistors and capacitors connected to the base of the control transistor 22 ensure that the base of this transistor is correctly biassed and that there is a limit on the current which passes through it. The collector of transistor 22 is also connected to the supply source, via a Zener diode 36 which is connected in series with an ordinary diode 37. The core 28 of the transformer 23 is connected to the mechanical ground 29 of the converter. The secondary of transformer 23 has an intermediate tap 30. The primary winding of the transformer contains $N_1$ turns while the secondary windings on either side of the intermediate tap 30 contain $N_2$ and $N_3$ turns. The secondary winding is connected from one end of winding $N_2$ to the base of the chopping transistor 4 via diode 32, series resistors $R_1$ and $R_2$ and capacitor $C_1$ shunting $R_1$ the other end of $N_2$ at tap 30 is also connected to the base of transistor 4 via diode 31 and inductor $L_B$. A resistor $R_B$ is connected between the base and emitter of transistor 4.

The way in which the control system operates will now be explained in detail.

In a first phase, the base of transistor 22, controlled by clock 8 via the modulator 9 of FIG. 1, changes from the 0 level to the 1 level for a period $\theta$. Transistor 22 saturates and the voltage induced in the secondary of transformer 29 causes the chopping transistor 4 to saturate also. During this phase the magnetizing current in transformer 29 increases.

In a second phase, the base of transistor 22 changes from the 1 level to the 0 level. The transistor blocks and the magnetizing energy of the transformer is recovered through the secondary winding $N_3$. The current flows in the reverse direction in the base of the chopping transistor 4. The transistor re-blocks. Inductance $L_B$ limits the extent of the drop $$\frac{dI_B}{dt}$$

in the current in the base of the transistor. Diodes 31 and 32 are respectively used to orientate the currents $I_{B2}$ and $I_{B1}$ in the base of the chopping transistor 4. Zener diode 26 and diode 27, which are connected in series, make it possible to eliminate the over-voltages which would arise when controlling the drop $$\frac{dI_B}{dt}$$

in the current in the base of the chopping transistor.

If the supply voltage is called $V_A$, the voltage drop in diode 31 is called $V_D$, the voltage drop in Zener diode 26 is called $V_Z$, the conducting time of the transistor 22 is called $\theta$, the value of the inductance of the primary of transformer 29 is called Lp, the inductance connected to the base of the chopping transistor 4 is called $L_B$, and the base-emitter voltage of the chopping transistor is called $V_{BE}$, it can be said that:

in the case of the forward current:

$$I_{B1} = \frac{V_A(N_2 + N_3) - (V_D + V_{BE})}{(R_1 + R_2)} - \frac{V_{BE}}{R_B}$$

and in the case of the reverse current:

$$\frac{dI_{B2}}{dt} = \frac{V_A + V_Z + V_D}{L_B}$$

The change in the base current $I_{B1}$ as a function of the base-emitter voltage $V_{BE}$ of the control transistor 22 and of the voltage drop $V_D$ in diode 31 needs to be small, thus enabling to avoid a too high a consumption of supply current and excessive fluctuations in the storage time of transistor 4. The voltage in the secondary of transformer 23, therefore, needs to be sufficiently high in comparison with the sum of voltages $V_{BE}$ and $V_D$ since the change in these parameters is considerable. Given these parameters and with the control circuit supplied from a supply source of 15 volts, for example, the transformation ratios are selected in such a way that:

$$\frac{N_1}{N_2 + N_3} = 2 \text{ and } \frac{N_1}{N_3} = 8$$

Knowing that the value of $$\frac{dI_B}{dt},$$

it is possible to calculate $L_B$. In the embodiment which has been described $L_B = 4$ microhenrys. The invention thus makes it possible to achieve the objects mentioned above, namely a reduction in the switching time of the chopping transistor, control of the charges stored in the emitter-base junction of this transistor, galvanic isolation between the rectified AC mains and the output of the converter, and isolation between the output of the converter and its chopping control system.

It is clear that the invention is not restricted to the embodiment described and that the means employed could be replaced by equivalent means without thereby departing from the scope of the invention.

I claim:

1. A chopping control system for a converter in a DC electrical power supply comprising a chopping transformer having a primary and a secondary winding, a chopping transistor, means for connecting the collector of said chopping transistor via the primary winding of said chopping transformer to a first terminal of a source of DC voltage to be chopped and the emitter of said chopping transistor to a second terminal of the source of DC voltage to be chopped, means for connecting the secondary winding of said transformer to a rectifying circuit, a control transistor for controlling firing of the chopping transistor, said control transistor having its emitter connected to a fixed reference potential and its collector connected to a DC supply source, a source of clock pulses, means operatively connecting the base of the control transistor for receiving said clock pulses to control chopping, a pulse transformer having a primary and a secondary winding, means for connecting the primary winding of said pulse transformer between the collector of the control transistor and the DC supply source, means for connecting the secondary winding of said pulse transformer at one of its ends and at a point intermediate its ends to the base of the chopping transistor and at its other end to the emitter of the chopping transistor so as to provide two isolated base circuits for said chopping transistor.

2. A chopping control system for a converter in a DC electrical power supply comprising a chopping transformer having a primary and a secondary winding, a chopping transistor, means for connecting the collector of said chopping transistor via the primary winding of said chopping transformer to a first terminal of a source of DC voltage to be chopped and the emitter of said chopping transistor to a second terminal of the source of DC voltage to be chopped, means for connecting the secondary winding of said transformer to a rectifying circuit, a control transistor for controlling firing of the chopping transistor, said control transistor having its emitter connected to a fixed reference potential and its collector connected to a DC supply source, a source of clock pulses, means operatively connecting the base of the control transistor for receiving said clock pulses to control chopping, a pulse transformer having a primary and a secondary winding, means for connecting the primary winding of said pulse transformer between the collector of the control transistor and the DC supply source, means for connecting the secondary winding of said pulse transformer at one of its ends and at a point intermediate its ends to the base of the chopping transistor and at its other end to the emitter of the chopping transistors, said means including a first rectifier connected between said one end and the base of the chopping transistor and disposed to conduct in the direction in which the base current flows and a second rectifier connected between said intermediate point and the base of the chopping transistor, said second rectifier being disposed to conduct in a direction opposite from that in which the base current flows in the chopping transistor.

3. A control system according to claim 2 wherein said first rectifier is connected to the base of the chopping transistor via a resistor, and said second rectifier is connected to this base via an inductance.

4. A control system according to claim 3 wherein the primary winding of the pulse transformer has connected in parallel therewith a series circuit including a rectifier and a Zener diode.

5. A control system according to claim 4 wherein the base of the control transistor for controlling chopping is connected to receive chopping control pulses via a logic gate.

6. A control system as set forth in claim 5 wherein said logic gate is an AND gate and includes an input for inhibiting the application of control clock pulses to the base of the control transistor.

7. A control system according to claim 6 wherein said source of clock pulses includes a modulator having output pulses at a fixed frequency to fix the chopping frequency and of a length to restrict the conduction time of the chopping transistor, a clock control connected to the modulator to set the frequency thereof, and means connected between the output of the converter and the modulator for modifying the length of the chopping pulses.

8. A control system according to claim 7 wherein said means includes a reference source, an operational voltage error amplifier, means for connecting the inputs of said operational amplifier to said reference source and the output of said converter so as to develop at the output of said amplifier an error voltage upon a deviation of the converter output from the established reference, said amplifier having its output connected to one input of said modulator to thereby control the length of the chopping pulses and thus cause the output voltage to adjust toward the established reference.

9. A control system according to claim 7 wherein said means includes a reference source, an operational current error amplifier, a current sensor connected to the output of the converter, means for connecting the inputs of said current error amplifier to said reference source and the current sensor so as to develop an error voltage at the output of said current error amplifier in response to a rise in output current in the converter above a predetermined value, said current error amplifier having its output connected to one input of said modulator to thereby control the length of the chopping pulses and thus control the conduction time of the chopping transistor.

10. A control system according to claim 7 wherein said means includes a first and a second reference source, a first error amplifier responsive to a deviation of the output voltage of the converter from a predetermined value to develop a first error control signal, a second error amplifier responsive to a rise in output current of the converter above a predetermined value to develop a second error control signal, said first and second amplifiers being connected to an input of said modulator to thereby control the length of the chopping pulses and conduction time of the chopping transistor.

* * * * *